Dec. 3, 1957  G. F. WIKLE ET AL  2,815,073
TIRE TRIMMING APPARATUS
Filed May 3, 1954  7 Sheets-Sheet 1

Fig. 1

INVENTOR.
GEORGE F. WIKLE
BY PHILIP PHILLIPS
Irwin M. Lewis
ATTORNEY.

Dec. 3, 1957    G. F. WIKLE ET AL    2,815,073
TIRE TRIMMING APPARATUS
Filed May 3, 1954    7 Sheets-Sheet 3

INVENTOR.
GEORGE F. WIKLE
BY  PHILIP PHILLIPS

ATTORNEY.

Dec. 3, 1957  G. F. WIKLE ET AL  2,815,073
TIRE TRIMMING APPARATUS
Filed May 3, 1954                                    7 Sheets-Sheet 6

Fig. 7

INVENTOR.
GEORGE F. WIKLE
BY PHILIP PHILLIPS
Irwin M. Lewis
ATTORNEY.

Fig. 12

United States Patent Office 2,815,073
Patented Dec. 3, 1957

2,815,073

TIRE TRIMMING APPARATUS

George F. Wikle and Philip Phillips, Detroit, Mich., assignors to United States Rubber Company, New York, N. Y., a corporation of New Jersey Application May 3, 1954, Serial No. 427,116

6 Claims. (Cl. 164—10.2)

This invention relates to apparatus for trimming undesirable protuberances such as flash and vent projections from the tread and sidewalls of a molded rubber tire.

As is well known, flash and vent projections are formed on the exterior surfaces of tires during the molding thereof by the flow of rubber between the mold halves at the parting line of the molds and the flow of rubber into the vent passageways provided through the walls of the molds to prevent entrapment of air.

One object of the present invention is to provide apparatus which will automatically and efficiently trim vent projections and flash from both the tread and sidewalls of a tire simultaneously.

Another object is to provide such trimming apparatus which is readily adaptable for trimming vent projections and flash from tires of various sizes.

A still further object is to provide such apparatus incorporating rotary cutters for trimming the vent projections and flash from tires.

Another object is to provide such apparatus incorporating a novel loading mechanism for automatically loading a tire into the apparatus and for ejecting a previously trimmed tire from the apparatus upon the completion of the trimming thereof, and incorporating control means actuated by the presence of a tire in the loading mechanism for automatically actuating the loading mechanism to load the tire in the apparatus upon completion of the trimming of a tire previously loaded in the apparatus.

Other objects and advantages of the present invention will become apparent from the following description when read in conjunction with accompanying drawings, wherein.

Figure 1:
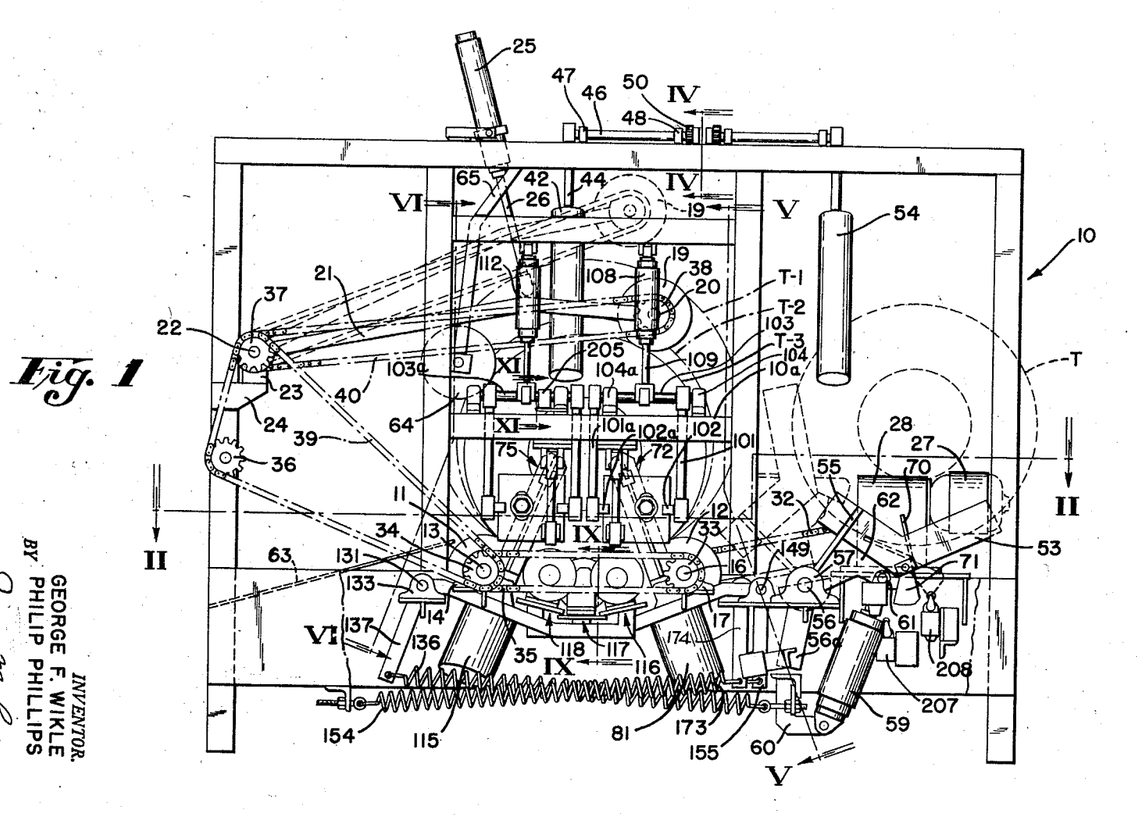
Fig. 1 is an elevational view of the apparatus of the present invention.
Figures 2, 8, 9, 10:
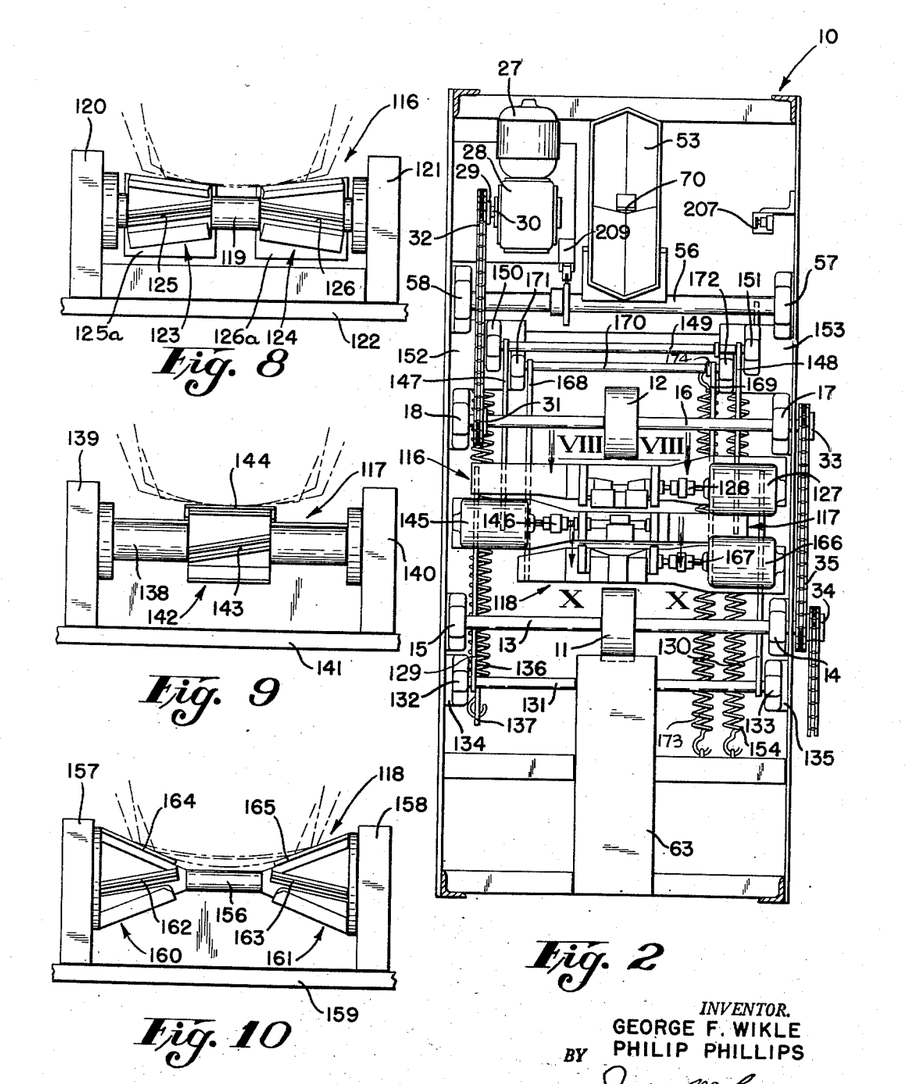
Fig. 2 is a sectional view taken on the line II—II of Fig. 1.
Fig. 8 is a sectional view taken on the line VIII—VIII of Fig. 2 showing one of the cutters for trimming vent projections from the tread of a tire casing and illustrating the engagement of tire casings of various sizes therewith.
Fig. 9 is a sectional view taken on the line IX—IX of Fig. 1 showing the cutters for removing flash from the center of a tread of a tire and illustrating the engagement of various size tires therewith.
Fig. 10 is a sectional view taken on the line X—X of Fig. 2 showing the cutter for trimming vent projections from the shoulder area of a tread of a tire and illustrating the engagement of various sized tires therewith.

Referring to the drawings, and in particular to Figs. 1 and 2 of the drawings, the apparatus of the present invention includes an open framework 10 upon which the various elements of the apparatus, including spaced, parallel tire supporting rollers 11 and 12, are supported or attached. Roller 11 is secured to a shaft 13 which, as best shown in Fig. 2, is journaled at each end in bearings 14 and 15 secured to the framework 10 at each side of the apparatus. Roller 12 is secured to a shaft 16 which is journaled at each end in bearings 17 and 18 also secured to the framework 10 on each side of the apparatus. The rollers 11 and 12 support the tire to be trimmed in an upright position and are spaced apart a distance to accommodate tires of various diameters as indicated by the broken lines T–1, T–2, T–3 in Fig. 1.

Figures 3, 4, 11:
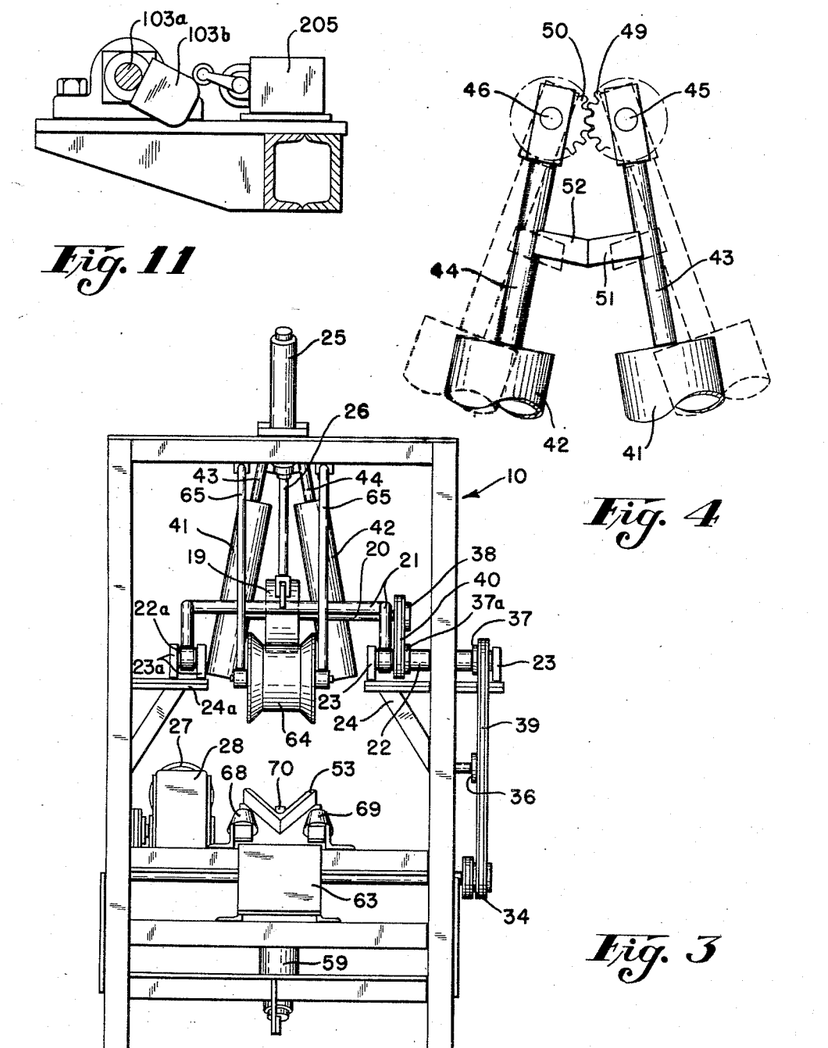
Fig. 3 is a left end view with parts removed of the apparatus as shown in Fig. 1.
Fig. 4 is the partial elevational view of the guide rollers of the apparatus which center and guide the tires during loading and rotation thereof.
Fig. 11 is a partial sectional view taken on the line XI—XI of Fig. 1, showing the position of one of the limit switches of the control circuit.

A third roller 19 secured to a shaft 20 engages the top of the tire to be trimmed to press the tires against the rollers 11 and 12. The shaft 20 is suitably journaled at each end in a frame 21 which in turn is pivotally mounted at one end on a shaft 22 and a shaft 22a. Shafts 22 and 22a are journaled in suitable bearings 23 and 23a carried by brackets 24 and 24a secured to the framework 10 adjacent each side of the framework as shown in Fig. 3. A fluid pressure actuated cylinder 25 is pivotally attached to the top of the framework 10 and its piston rod 26 is pivotally attached to the pivotally mounted frame 21. Admission of pressure to the cylinder 25 to retract the piston rod 26 thereof, therefore, serves to raise the frame 21 and roller 19 carried thereby, as shown by the dash lines in Fig. 1, to permit loading and unloading of a tire from the rollers 11 and 12.

Supporting rollers 11 and 12 and roller 19 are all driven simultaneously from a motor 27 through a speed reducer 28 and a series of chains and sprockets. Roller 12 is driven directly from the speed reducer 28 by means of a sprocket 29 secured to the output shaft 30 of the speed reducer 28, a sprocket 31 secured to the shaft 16, and a chain 32 interconnecting the sprockets 29 and 31. Roller 11 is driven from the shaft 16 by means of a sprocket 33 secured to the shaft 16, a double sprocket 34 secured to shaft 13 and a chain 35 interconnecting the sprockets 33 and 34. Roller 19 is driven from shaft 13 by double sprocket 34, an idler sprocket 36 secured to framework 10, a sprocket 37 and a sprocket 37a secured to shaft 22, a sprocket 38 secured to shaft 20, a chain 39 interconnecting sprockets 34, 36 and 37, and a chain 40 interconnecting sprockets 37a and 38.

A tire positioned on the rollers 11 and 12 is held in upright position and centered by elongated rollers 41, 42 which engage opposite sides of the tire. The rollers 41 and 42 are rotatably supported on shafts 43 and 44 which in turn are pivotally suspended from the top of the framework 10 above the rollers 11 and 12 by means of shafts 45 and 46 which are journaled in suitable bearings 47 and 48 secured to the top of the framework 10. The shafts 45 and 46 are geared together by means of gears 49 and 50 (Fig. 4) secured to the ends thereof so that the rollers 42 and 41 must pivot toward or away from each other in unison. This pivotal suspension of rollers 41, 42 adapts them for supporting and centering tires of various cross sectional thicknesses. The weight of the suspended rollers 43 and 44 urge them toward each other and therefore against the sidewalls of the tire. Stops 51 and 52 secured to shafts 44 and 43, respectively, limit the inward movement of the shafts 44 and 43 and rollers 41 and 42 towards each other.

A tire T to be trimmed is automatically loaded onto the tire supporting rollers 11 and 12 by means of a special mechanism including a trough 53 into which the tire T to be trimmed is initially placed. The trough 53 is generally V-shaped in cross section and V-shaped in elevation and is positioned in alignment with the rollers 11 and 12 at one end of the apparatus. A tire T placed in the trough 53 is held in upright position by a pair of elongated rollers 54, only one of which can be seen in Fig. 1. The rollers 54 are identical to rollers 41 and 42 and are pivotally suspended from the top of the framework 10 in a similar manner as rollers 41 and 42. The trough 53 is supported for pivotal movement towards the rollers 11 and 12 to deposit a tire T carried thereby onto the rollers 11 and 12 by a plate 55 which is rigidly secured to the trough at one end and to a shaft 56 at the other end. Shaft 56 is freely journaled at its ends in bearings 57 and 58 secured to the framework 10 on opposite sides thereof. The trough 53 is pivoted towards the rollers 11 and 12, as shown by the dash lines in Fig. 1, by means of a fluid actuated cylinder 59. Cylinder 59 is pivotally attached to a bracket 60 which in turn is secured to the framework 10 and the piston rod 61 of the cylinder 59 is pivotally attached to a plate 62 secured to the bottom of trough 53. Admission of fluid under pressure to the cylinder 59 to extend the piston rod 61 thereof, therefore, serves to pivot the trough 53 and a tire T carried thereby toward the rollers 11 and 12 to deposit the tire T thereon. If there is a previously trimmed tire already positioned on the rollers 11 and 12, the tire T carried by the trough 53 engages and ejects the tire from the rollers 11 and 12 as the trough 53 is pivoted towards the rollers 11 and 12. The tire so ejected rolls down an incline plate 63 secured to the framework 10 at the opposite end thereof from the trough 53. A freely rotatable flanged roller 64, pivotally suspended from the top of the framework 10 by means of arms 65, engages a tire as it is deposited on the rollers 11 and 12 and prevents the tire from accidentally rolling off the rollers 11 and 12 due to its forward momentum. The pivotal suspension of the roller 64, allows a previously trimmed tire to be ejected from the rollers 11 and 12 while retaining a new tire being deposited on the rollers 11 and 12 by the trough 53. Rollers 66 and 67 secured to the framework 10 adjacent roller 12 and rollers 68 and 69 secured to the framework 10 adjacent roller 11 prevents a tire supported on the rollers 11 and 12 from moving laterally off the rollers 11 and 12 during rotation thereof.

A plate 70 is pivotally mounted in and extends up from the bottom of the trough 53 and when a tire T is placed therein, the plate 70 is pivoted towards the bottom of the trough as shown in dash lines of Fig. 1. A limit switch actuating leg 71 is secured to the plate 70 and extends from the bottom of the trough 53. When the plate 70 is pivoted by the presence of a tire T in the trough 53, the leg 71 actuates a limit switch which initiates pivoting of trough 53 and movement of certain of the cutters towards the tire supported on the rollers 11 and 12, as will hereinafter be described in detail.

Figure 5:
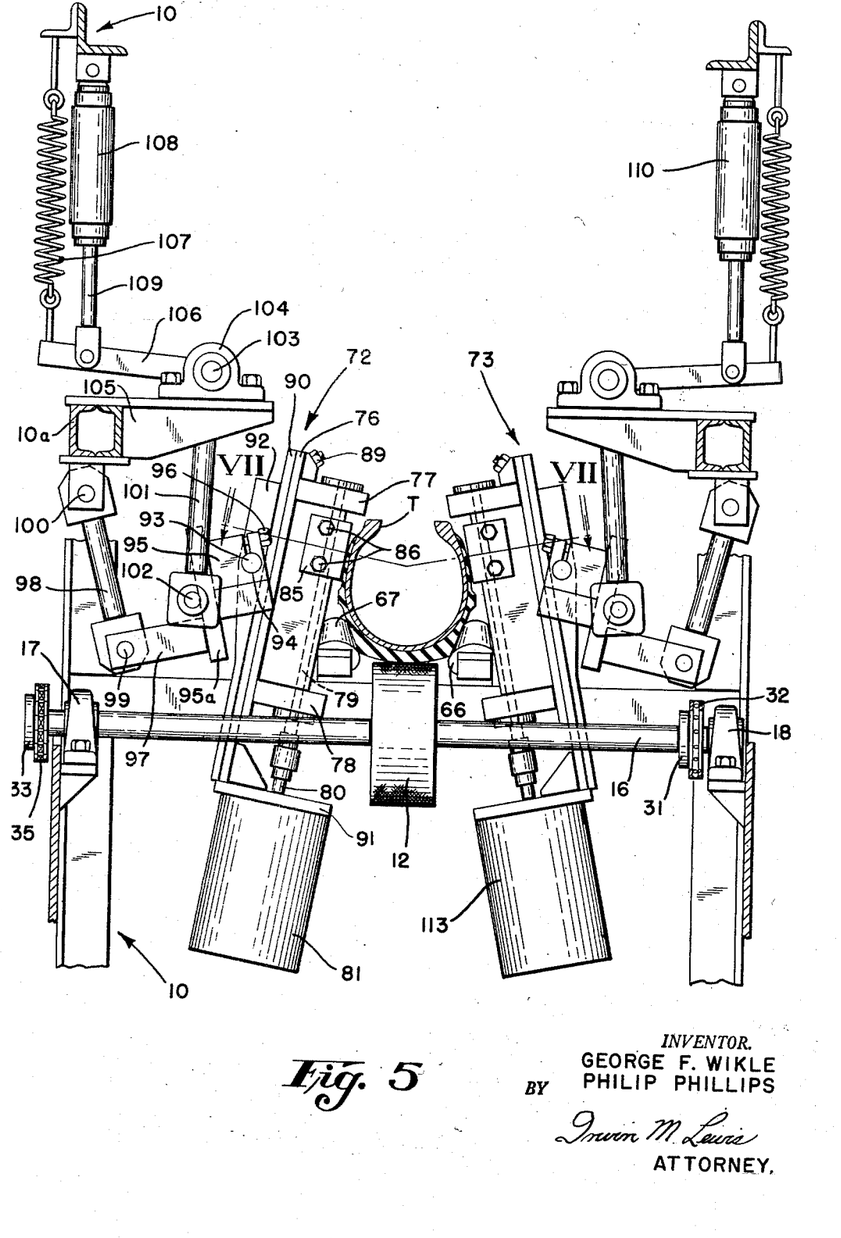
Fig. 5 is a sectional view taken on the line V—V of Fig. 1 showing engagement of one set of cutters for trimming projections from the sidewalls of a tire.
Figure 6:
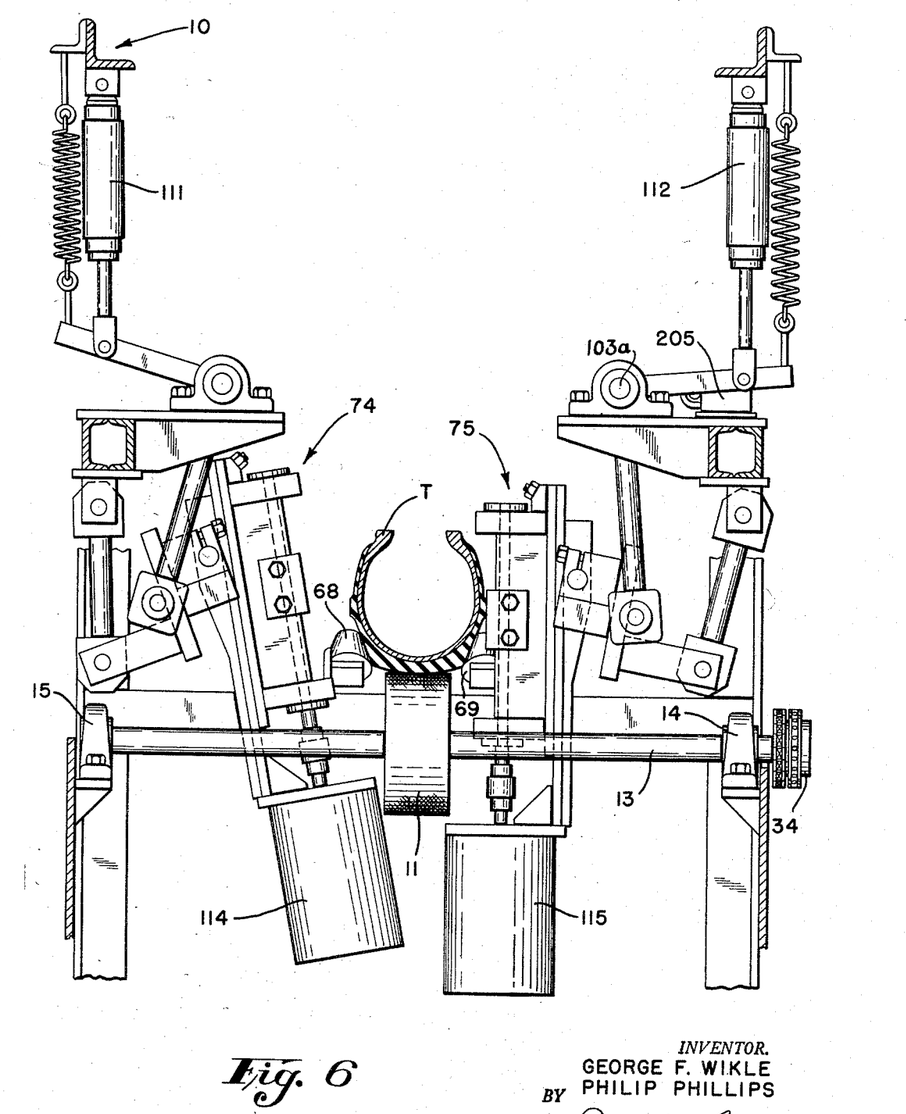
Fig. 6 is a sectional view taken on the line VI—VI of Fig. 1 showing engagement of another set of cutters for trimming projections from the sidewalls of a tire.
Figure 7:
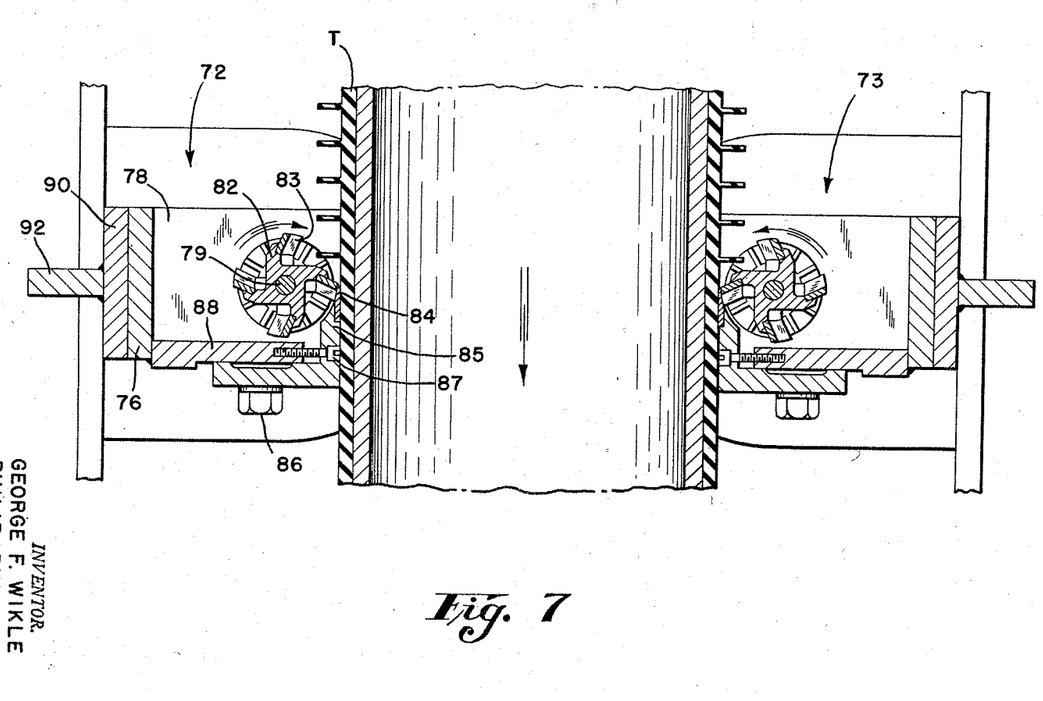
Fig. 7 is a sectional view taken on the line VII—VII of Fig. 5.

Flash and vent projections are trimmed from both the tread and sidewalls of the tire supported and rotated on the rollers 11 and 12 by seven rotary cutter assemblies, each driven by an individual electric motor. As best shown in Figs. 5, 6 and 7, four cutter assemblies, generally designated by the reference numerals 72, 73, 74 and 75, are provided for trimming the vent projections from the sidewalls of a tire T. Cutter assemblies 72 and 73 serve to trim vent projections extending from the surfaces of a tire T between the beads of the tire and the buffing ribs and cutter assemblies 74 and 75 serve to trim vent projections extending from the surface of the buffing ribs. Each of the cutter assemblies 72, 73, 74 and 75 are essentially of the same construction and mounted essentially in the same manner, so a description of cutter mechanisms 72 and its mounting will suffice for all.

As best shown in Figs. 5 and 7, the cutter assembly 72, includes a base plate 76 to which is attached spaced, aligned, bearings 77 and 78. A shaft 79 is rotatably supported in the bearings 77 and 78 and is coupled at one end to a shaft 80 of an electric motor 81. A rotary cutter 82, provided with circumferentially spaced, angularly disposed, cutting blades 83 of hardened steel or tungsten carbide, is secured to the shaft 79. A stationary shear blade 84 of hardened steel or tungsten carbide, past which the blades 83 pass upon rotation of the shaft 79 to trim the vent projections, is secured to an L-shaped backing plate 85. The backing plate 85 is adjustably secured by means of clamping bolts 86 and adjusting screw 87 to a supporting plate 88, which in turn is welded to base plate 76. By loosening bolts 86 and turning screw 87, the clearance between the shear plate 84 and the cutting edges of the blades 83 may be adjusted as desired.

The base plate 76 is removably secured by means of a bolt 89 to a plate 90 to permit easy removal and replacement thereof. Motor 81 is attached to a plate 91 secured to the end of the plate 90.

A rigid rib or flange 92 is secured to the back of the plate 90 and a stud 93 is rigidly secured to the rib 92. The stud is received in an opening 94 through a clamping block 95 and rigidly secured therein by a clamping bolt 96 so that the cutter assembly 72 is rigidly secured to the clamping block 95. Block 95 is rigidly secured to a plate 95a. Plate 95a in turn is rigidly secured to the end of a link member 97. A second link member 98 is pivotally secured at one end to the other end of link member 97 by means of a pin 99 and pivotally secured to the underside of a horizontally extending framework member 10a by means of a pin 100. A pair of link members 101 and 101A (Fig. 1) are pivotally attached at one end to pins 102 and 102a rigidly attached to the plate 95a, and rigidly secured at their other ends to a shaft 103 which is freely journaled in a bearing 104 secured to a bracket 105. The bracket 105 is secured to the horizontal framework member 10a. This link arrangement allows the cutter assembly 72 to swing by gravity against the side of the tire T as shown in Fig. 5. A lever arm 106 is secured at one end to the shaft 103. An extension spring 107, secured at one end to the free end of the lever arm 106 and at the other end to the top of the framework 10, serves as a counterbalance to limit the pressure of the cutter assembly 72 against the tire T. A fluid actuated cylinder 108 is pivotally secured to the top of the framework 10 above the lever arm 106 and its piston rod 109 is pivotally secured to the lever arm 106. Admission of fluid under pressure to the cylinder 108 to retract the piston rod 109 thereof, therefore, serves to swing the cutter assembly 72 up and away from the tire T. Release of the pressure on the cylinder 108 allows the cutter assembly to swing by gravity against the tire T.

Cutter assembly 73 is similarly constructed and mounted on the opposite side of the machine as shown in Fig. 5. A fluid actuated cylinder 110 serves to retract cutter assembly 73. Cutter assemblies 74 and 75 are also similarly constructed and mounted on opposite sides of the machine as shown in Figs. 1 and 6. Cutter assembly 74 is retracted by a fluid actuated air cylinder 111 and cutter assembly 75 is retracted by a fluid actuated cylinder 112. Cutter assembly 74 is shown in retracted position in Fig. 6. Electric motors 113, 114 and 115 serve to rotate the rotary cutters of cutter assemblies 73, 74 and 75, respectively.

Three cutter assemblies generally designated by the reference numerals 116, 117 and 118 are provided for trimming the flash and vent projections from the tread of a tire supported and rotated on rollers 11 and 12. As best shown in Fig. 8, the cutter assembly 116 includes a shaft 119, journaled in spaced, aligned bearings 120 and 121 secured to a base plate 122. Two spaced, oppositely tapered, rotary cutters 123 and 124, provided with circumferentially spaced, angularly disposed cutting blades 125 and 126, respectively, of hardened steel or tungsten carbide, are secured to the shaft 119. Shear plates 125a and 126a (Fig. 8), adjustably secured to the base plate 122 in a similar manner as shear plate 84 of cutter assembly 72, serve in conjunction with the cutters 123 and 124 to trim vent projections from the marginal portions of the tread of a tire supported and rotated on the rollers 11 and 12. An electric motor 127 secured to the base plate 122 and coupled by a coupling 128 to the shaft 119 serves to rotate the shaft 119 and the cutters 123 and 124 secured thereto. Base plate 122 is rigidly secured to the ends of two spaced, parallel arms 129 and 130 (Fig. 2). The arms 129 and 130 are in turn secured to a transverse shaft 131 which is journaled at its opposite ends in bearings 132 and 133. Bearings 132 and 133 are secured to brackets 134 and 135 attached to the framework 10 on opposite sides of the apparatus. An extension spring 136 secured at one end to the framework 10 and at the other end to the free end of a lever arm 137 secured to the shaft 131 urges the cutter assembly 117 against the tread of a tire supported on the rollers 11 and 12.

As best shown in Fig. 9, the cutter assembly 117 is similar in construction to cutter assembly 116, and includes a shaft 138, suitably journaled in aligned, spaced bearings 139 and 140 which are secured to a base plate 141. A single, cylindrical, rotary cutter 142 having angularly disposed, circumferentially spaced, cutting blades 143 of hardened steel or tungsten carbide, is secured to the center of the shaft 138 and serves in conjunction with a shear plate 144 (Fig. 9) to trim flash and vent projections extending from the center of the tread of a tire supported and rotated on rollers 11 and 12. An electric motor 145 secured to the base plate 141 and coupled by means of a coupling 146 to shaft 138 serves to rotate the cutter 142. The cutter assembly 117 is mounted for pivotal movement towards the tread of the tire supported by the rollers 11 and 12 by means of spaced, parallel arms 147 and 148 (Fig. 2) which are rigidly attached at one end to the base plate 142 and at the other end to a transversely extending shaft 149. Shaft 149 is freely journaled in spaced bearings 150 and 151 attached to brackets 152 and 153, which are secured to framework 10 on opposite sides of the apparatus. An extension spring 154 secured at one end to the free end of a lever arm 155 (Fig. 1) which is rigidly secured to the shaft 149, serves to urge the cutter assembly 117 up between the rollers 11 and 12 and against the tread of a tire supported on the rollers 11 and 12.

As shown in Fig. 10, cutter assembly 118 is also of a similar construction to the cutter assembly 116 and includes a shaft 156, suitably journaled in spaced, aligned bearings 157 and 158, which are secured to a base plate 159. Two oppositely tapered, spaced rotary cutters 160 and 161 similar to the cutters 123 and 124 of the cutter assembly 116, but having a larger angle of taper, are secured to the shaft 156. The cutters 160 and 161 are provided with circumferentially spaced, angularly disposed cutting blades 162 and 163 of hardened steel or tungsten carbide and serve in conjunction with shear plates 164 and 165 (Fig. 10) to trim vent projections extending from the tread of a tire adjacent the shoulders thereof.

An electric motor 166 secured to the base plate 159 and coupled by means of a coupling 167 to the shaft 156, serves to rotate the shaft 156 and the cutters 160 and 161 attached thereto. The cutter assembly 118 is mounted for pivotal movement towards the tread of a tire supported on the rollers 11 and 12 by means of spaced parallel arms 168 and 169 (Fig. 2). The arms 168 and 169 are rigidly attached at one end to the base plate 159 and are attached at their other ends to a transversely extending shaft 170. Shaft 170 is freely journaled in bearings 171 and 172 secured to spaced brackets 152 and 153 (Fig. 2). An extension spring 173 is secured at one end to the framework 10 and at its other end to the free end of a lever arm 174 (Figs. 1 and 2) secured to the shaft 170, serves to urge the cutter assembly 118 up between the rollers 11 and 12 and against the tread of a tire supported on the rollers 11 and 12.

It can be seen, therefore, from Figs. 8, 9 and 10 that the three cutter assemblies 116, 117 and 118, insure that all flash and vent projections are trimmed from the treads of various size tires or tires having different crown radii.

*Control system and cycle of operation*

Figure 12:
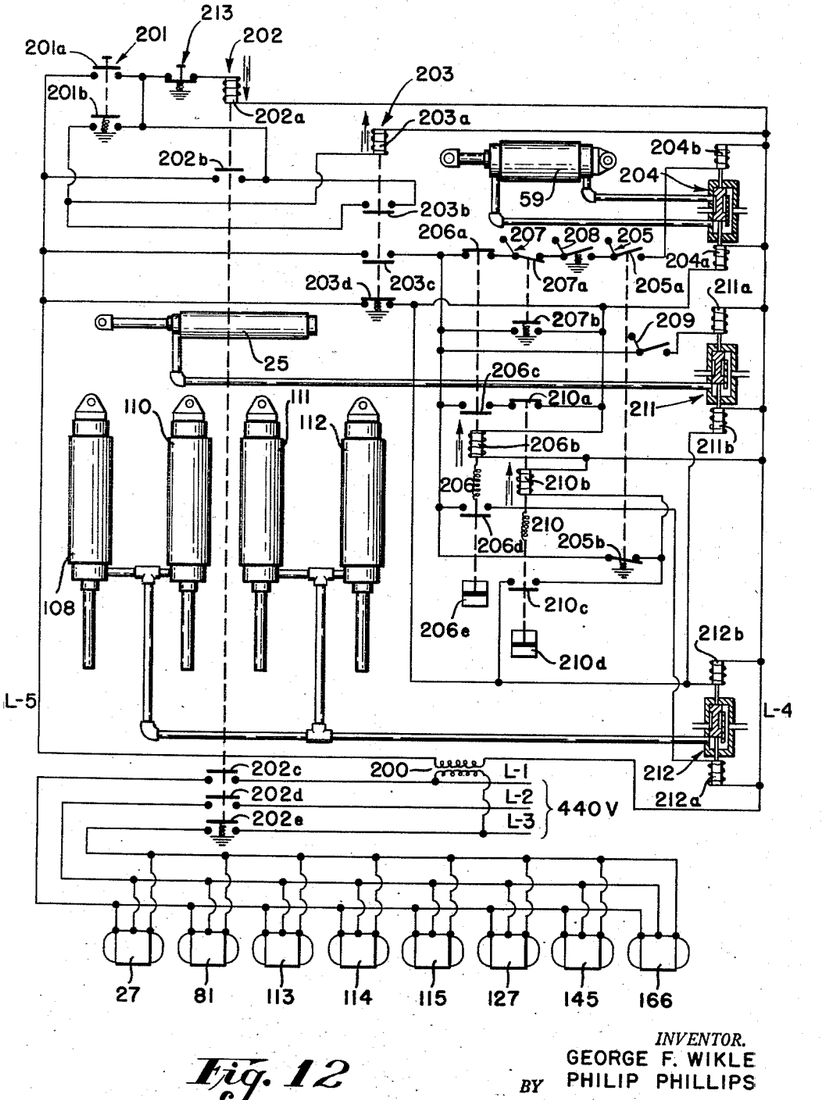
Fig. 12 is a combined wiring and piping diagram showing the automatic control system for the apparatus.

The control system for the apparatus is shown in the combined electrical and piping diagram of Fig. 12. The electrical control system includes a 440 volt, three wire power circuit L–1, L–2, L–3, and a 110 volt, two wire control circuit L–4, L–5. The control circuit L–4, L–5 receives its electrical energy from the power circuit L–1, L–2, and L–3 by means of a step-down transformer 200.

In the diagram, all limit switches are shown in their non-actuated position, all relays in a non-energized condition, and all valves shown in a position to hold the piston rods of the fluid actuated cylinders they control in a retracted position.

A cycle of operation is initiated by momentarily pressing a push switch 201 to close contacts 201a and 201b thereof. The closing of contacts 201a completes a circuit to energize a solenoid 202a of a relay 202 to close normally opened contacts 202b, 202c, 202d and 202e thereof. Closing of contacts 202b provides a holding circuit around contacts 201a of push switch 201 so that solenoid 202a remains energized when the push switch 201 is released. Closing of contacts 202c, 202d and 202e completes the circuit to start motors 81, 113, 114, 115, 127, 145 and 166 which drive the rotary cutters of cutter assemblies 72, 73, 74, 75, 116, 117 and 118 and motor 27 which drives the rollers 11, 12 and 19. Closing of contacts 201a and 201b also completes a circuit to energize the solenoid 203a of a relay 203 to close normally open contacts 203b and 203c and open normally closed contacts 203d. The closing of contacts 203b completes a holding circuit, through closed contacts 202b, around contacts 201b of push switch 201 to hold solenoid 203a energized when push switch 201 is released. Opening of contacts 203d breaks the circuit to solenoid 204a of a solenoid actuated slide valve 204.

A tire is next placed in the trough 53. The placing of a tire in the trough 53 pivots plate 70 so that limit switch actuating leg 71 (Fig. 1) actuates a limit switch 208 to close the normally open contacts thereof. The closing of the contacts of limit switch 208 completes a circuit through previously closed contacts 203c of relay 203, normally closed contacts 206a of a relay 206, normally closed contacts 207a of a limit switch 207 and contacts 205a of a limit switch 205 (Fig. 11), which is actuated when the cutter assembly 72 is in its retracted position, to energize solenoid 204b of valve 204. As best shown in Fig. 11, limit switch 205 is mounted adjacent supporting shaft 103a of cutter assembly 75 and is actuated by a cam block 103b secured to the shaft 103a when the cutter assembly 75 is in retracted position. Energization of solenoid 204b shifts the slide of valve 204 to admit fluid under pressure to the fluid actuated cylinder 59 to extend the piston rod 61 thereof and thereby pivot the trough 53 with a tire therein towards the rollers 11 and 12 to deposit the tire thereon.

As trough 53 is pivoted, limit switch 208 is released, thereby allowing the contacts thereof to open, and thereby break the circuit to solenoid 204b. At the same time, a limit switch 209 (Fig. 2) is actuated to close the contacts thereof by a cam block (not shown) secured to the piston rod 61 of the fluid actuated cylinder 59. The closing of the contacts of limit switch 209 completes a circuit to energize solenoid 211a of slide valve 211 to shift the slide thereof to release the pressure on fluid cylinder 25 to allow the roller 19 to drop by gravity onto the top of a tire deposited on rollers 11 and 12 to thereby press the tire against the cutter assemblies 116, 117 and 118 and against the rollers 11 and 12. When the trough 53 reaches its extreme pivoted position, limit switch 207 is actuated by an arm 56a secured to the shaft 56 (Fig. 1). Actuation of limit switch 207 opens normally closed contacts 207a and closes the normally opened contacts 207b thereof.

Closing of contacts 207b completes a circuit through previously closed contacts 203c of relay 203 to energize solenoid 204a of valve 204. Energization of solenoid 204a shifts the slide of valve 204 to admit pressure to the fluid actuated cylinder 59 to retract the piston rod thereof and thereby return the trough 53 back to its initial loading position.

Closing of contacts 207b of limit switch 207 also completes a circuit to energize the solenoid 206b of relay 206. Energization of solenoid 206b instantaneously closes normally open contacts 206c, instantaneously opens normally closed contacts 206a and closes normally opened contacts 206d after a time delay occasioned by dash pot 206e. Closing of contacts 206c completes a holding circuit through contacts 210a of a relay 210 around contacts 207b of limit switch 207 so that solenoid 204a of valve 204 remains energized when limit switch 207 is released as trough 53 is returned to its initial loading position. After a short time delay to allow the tire to become properly seated on the rollers 11 and 12, contacts 206d close completing a circuit to energize solenoid 212a of a slide valve 212. Energization of solenoid 212a shifts the slide of valve 212 to release the pressure on cylinders 108, 110, 111 and 112 to thereby allow the cutter assemblies 72, 73, 74 and 75 to swing by gravity into contact with the sides of the tire supported and rotated on rollers 11 and 12. As the cutter assemblies swing towards the tire, limit switch 205 is released, thereby allowing contacts 205a to open and contacts 205b to close. Closing of contacts 205b complete a circuit through contacts 203c to energize the solenoid 210b of relay 210. Energization of solenoid 210b instantaneously opens contacts 210 and closes contacts 210c after a time delay occasioned by dash pot 210d of sufficient duration to allow the tire supported on the rollers 11 and 12 to make at least one complete revolution so that it can be trimmed around the full circumference thereof.

Opening of contacts 210a breaks the circuit to solenoid 206b so that contacts 206c and 206d open and solenoid 212a is de-energized. Closing of contacts 210c after a time delay, completes a circuit through closed contacts 203c and closed contacts 205b to energize solenoid 212b of slide valve 212. Energization of solenoid 212b shifts the slide of valve 212 to admit pressure to fluid actuated cylinders 108, 110, 111 and 112 to retract the piston rod thereof and thereby retract the cutter assemblies 72, 73, 74 and 75. Upon complete retraction of the cutter assemblies, the limit switch 205 is again actuated to close contacts 205a and open contacts 205b. This completes a cycle of operation.

If another tire has been placed in trough 53 so that limit switch 208 is actuated, a new cycle of operation starts when contacts 205a are closed on retraction of the cutter assemblies. As the trough pivots the new tire towards the rollers 11 and 12, the new tire ejects the previously trimmed tire from the machine. If the cutter assemblies have already retracted so that contacts 205a are closed, the placing of a new tire in the trough 53 actuates limit switch 208 and a new cycle of operation starts. The machine may be stopped completely by pressing push switch 213 so that the solenoids 202a and 203a of relays 202 and 203 are de-energized.

From the above description, it can be seen that there is provided apparatus that will automatically and efficiently trim vent projections and flash from the tread and sidewalls of tires of various sizes. The apparatus incorporates rotary cutters mounted and arranged in a novel manner so that flash and vent projections are simultaneously removed from all exterior surfaces of the tire. Novel loading means are provided for quickly and efficiently loading the tires into proper position for trimming and novel control means associated with the loading means provide automatic recycling of the apparatus upon the placing of a tire in the loading means.

It is to be understood that the above description in the accompanying drawings are for the purpose of illustration only and not by way of limitation and changes or modifications may be made therein without departing from the spirit or the scope of the invention.

Having thus described our invention, what we claim and desire to protect by Letters Patent is:

1. Apparatus for trimming projections from the surfaces of a molded rubber tire comprising, a frame, a pair of spaced parallel tire supporting rollers mounted on said frame, means for rotating said rollers to rotate a tire supported on said rollers, a plurality of cutter assemblies mounted on said frame for movement against the tread and sidewall surfaces of a tire supported on said rollers to trim projections extending from the surfaces of said tire, means for retracting said cutter assemblies from the sidewall surfaces of the tire, means for supporting a tire in an upright position pivotally secured to said frame in alignment with said supporting rollers, means to oscillate said tire supporting means about its pivot in a direction towards said tire supporting rollers to deposit a tire supported therein onto said tire supporting rollers, and means actuated by the presence of a tire in said tire supporting means to cause said oscillating means to pivot said tire supporting means towards said tire supporting rollers to deposit a tire supported therein onto said rollers when said cutter assemblies are in a retracted position.

2. Apparatus for trimming projections from the surface of a molded rubber tire comprising, a frame, a pair of spaced parallel tire supporting rollers mounted on said frame, means for rotating said rollers to rotate a tire supported thereon, means secured to said frame for maintaining a tire supported on said rollers in upright position, separate trimming means for trimming projections extending from each sidewall surface of a tire supported on said tire supporting rollers, means mounting each of said trimming means on said frame for movement towards and away from each sidewall surface of the tire supported on said tire supporting rollers, said mounting means for each trimming means including a shaft rotatably journaled on said frame above said rollers, a downwardly extending link member secured at one end to said shaft and pivotally secured at its other end to the trimming means, a second downwardly extending link pivotally attached to said frame above said rollers at a point laterally spaced from said shaft, a third link rigidly secured at one end to said trimming means and pivotally secured at its other end to the other end of said second link, and means for rotating said shaft whereby said trimming means is lifted up and away from the sidewall of the tire supported on said tire supporting means.

3. Apparatus for trimming projections from the surface of a molded rubber tire comprising, a frame, a pair of spaced parallel tire supporting rollers mounted on said frame, means for rotating said rollers to rotate a tire supported thereon, means secured to said frame for maintaining a tire supported on said rollers in upright position, separate trimming means for trimming projections extending from each sidewall surface of a tire supported on said tire supporting rollers, means mounting each of said trimming means on said frame for movement towards and away from each sidewall surface of said tire supported on said tire supporting rollers, said mounting means for each trimming means including a shaft rotatably journaled on said frame above said rollers, a downwardly extending link member secured at one end to the said shaft and pivotally secured at its other end to said trimming means, a second downwardly extending link member pivotally attached to said frame above said rollers at a point laterally spaced from said shaft, a third link member rigidly secured at one end to said trimming means and pivotally secured at its other end to the other end of said second link member, and means for rotating said shaft whereby said trimming means is lifted up and away from the sidewall of the tire supported on said tire supporting rollers, means for supporting a tire in upright position pivotally secured to said frame in alignment with said tire supporting rollers, and means to oscillate said tire supporting means about its pivot in a direction towards said tire supporting rollers to deposit a tire supported therein onto said tire supporting rollers.

4. Apparatus for trimming projections from the surface of a molded rubber tire comprising, a frame, a pair of spaced parallel tire supporting rollers mounted on said frame, means for rotating said rollers to rotate a tire supported thereon, means secured to said frame for maintaining a tire supported on said rollers in upright position, separate trimming means for trimming projections extending from each sidewall surface of a tire supported on said tire supporting rollers, means mounting each of said trimming means on said frame for movement towards and away from each sidewall surface of the tire supported on said tire supporting rollers, said mounting means for each trimming means including, a shaft rotatably journaled on said frame above said tire supporting rollers, a downwardly extending link member secured at one end to said shaft and pivotally secured at its other end to said trimming means, a second downwardly extending link member pivotally attached to said frame above said rollers at a point laterally spaced from said shaft, a third link member rigidly secured at one end to said trimming means and pivotally secured at its other end to the other end of said second link member and means for rotating said shaft whereby said trimming means is lifted up and away from the sidewall of the tire, a trough for supporting a tire in an upright position pivotally secured to said frame in alignment with said tire supporting rollers, means to oscillate said trough about its pivot in a direction towards said tire supporting rollers to deposit a tire supported therein onto said rollers, means actuated by the presence of a tire in said trough to pivot said trough towards said tire supporting rollers to deposit a tire supported therein onto said rollers when said trimming means are in a retracted position.

5. Apparatus for trimming projections from the surface of a molded rubber tire comprising, a frame, a pair of spaced parallel tire supporting rollers mounted on said frame, means for rotating said tire supporting rollers to rotate a tire supported thereon, a pair of freely rotatable elongated rollers pivotally suspended at one of their ends from said frame above said tire supporting rollers means interconnecting the said ends of said rollers for simultaneous movement towards each other by gravity to engage opposite sides of a tire supported on said tire supporting rollers to center and maintain said tire in upright position during rotation thereof, trimming means for trimming projections extending from each sidewall surface of a tire supported on said tire supporting rollers, means mounted each of said trimming means on said frame for movement towards and away from each sidewall surface of a tire supported on said tire supporting rollers, said mounting means for each trimming means including a shaft rotatably journaled on said frame above said rollers, a downwardly extending link member secured at one end to said shaft and pivotally secured at its other end to said trimming means, a second downwardly link member pivotally attached to said frame above said rollers at a point laterally spaced from said shaft, a third link member rigidly secured to said trimming means at one end and pivotally secured at its other end to the other end of said second link member, and means for rotating said shaft whereby said trimming means is lifted up and away from the sidewall of the tire.

6. Apparatus for trimming projections from the surface of a molded rubber tire comprising, a frame, a pair of spaced parallel tire supporting rollers mounted on said frame, means for rotating said rollers to rotate a tire supported thereon, a pair of freely rotatable elongated rollers pivotally suspended at one of their ends from said frame above said rollers, means interconnecting the said ends of said rollers for simultaneous movement towards each other by gravity to engage opposite sides of a tire supported on said tire supporting rollers to center and maintain said tire in an upright position, separate trimming means for trimming projections extending from each sidewall surface of a tire supported on said tire supporting rollers, means mounting each of said trimming means on said frame for movement towards and away from each sidewall surface of the tire, said mounting means for each trimming means including a shaft rotatably journaled on said frame above said rollers, a downwardly extending link member secured at one end to said shaft and pivotally secured at its other end to said trimming means, a second downwardly extending link member pivotally attached to said frame above said tire supporting rollers at a point spaced from said shaft, and a third link member rigidly secured at one end to said trimming means and pivotally secured at its other end to the other end of said second link member, and means for rotating said shaft whereby said trimming means is lifted up and away from the sidewall of the tire supported on said tire supporting rollers.

References Cited in the file of this patent

UNITED STATES PATENTS

| | | |
|---|---|---|
| 1,350,993 | Shaw | Nov. 16, 1920 |
| 1,440,397 | McClenathen et al. | Jan. 2, 1923 |
| 1,658,852 | Messer | Feb. 4, 1928 |
| 1,889,690 | Morris | Nov. 29, 1932 |
| 1,956,331 | Mullin | Apr. 24, 1934 |
| 2,034,662 | McLaughlin et al. | Mar. 17, 1936 |
| 2,168,500 | Steinhauer | Aug. 8, 1939 |
| 2,524,489 | Strong | Oct. 3, 1950 |
| 2,581,928 | Broden | Jan. 8, 1952 |
| 2,603,290 | Lindemann | July 15, 1952 |
| 2,607,630 | Le Febvre et al. | Aug. 19, 1952 |
| 2,634,492 | Kent | Apr. 14, 1953 |
| 2,692,458 | Lawrence | Oct. 26, 1954 |